United States Patent
Ledesma (10) Patent No.: US 6,837,185 B1
(45) Date of Patent: Jan. 4, 2005

(54) RELIGIOUS MEDITATION APPARATUS

(76) Inventor: Rodolfo Vallejo Ledesma, 4534 Charriton Dr., Houston, TX (US) 77039

(*) Notice: Subject to any disclaimer, the term of this patent is extended or adjusted under 35 U.S.C. 154(b) by 0 days.

(21) Appl. No.: 10/700,938

(22) Filed: Nov. 4, 2003

Related U.S. Application Data (60) Provisional application No. 60/424,371, filed on Nov. 6, 2002.

(51) Int. Cl.[7] .................................................. A01K 5/00
(52) U.S. Cl. ........................ 119/454; 119/462; 119/464; 119/429
(58) Field of Search .............................. 119/454, 51.01, 119/459, 61.1, 460, 432, 464, 470, 475, 482, 428, 429; 446/476; D30/110, 124, 108, 125, 111

(56) References Cited

U.S. PATENT DOCUMENTS

| | | | | |
|---|---|---|---|---|
| 315,925 A | * | 4/1885 | Evans ......................... | 119/454 |
| 1,649,902 A | * | 11/1927 | Victor ......................... | 119/462 |
| 2,655,130 A | * | 10/1953 | Simmons ..................... | 119/454 |
| 3,100,474 A | * | 8/1963 | Gabriel ........................ | 119/166 |
| 3,295,498 A | * | 1/1967 | Brown ......................... | 119/429 |
| 4,803,952 A | * | 2/1989 | Houser ........................ | 119/499 |
| 5,099,794 A | * | 3/1992 | Pearce, Jr. ................... | 119/482 |
| 5,964,189 A | * | 10/1999 | Northrop et al. ............ | 119/482 |
| 6,041,741 A | * | 3/2000 | Gabriel et al. .............. | 119/417 |
| 6,095,087 A | | 8/2000 | Bloedorn .................... | 119/52.2 |
| 6,338,317 B1 | * | 1/2002 | Smith .......................... | 119/482 |
| 6,408,796 B1 | * | 6/2002 | Hampel ....................... | 119/498 |

* cited by examiner

*Primary Examiner*—Yvonne P. Abbott
(74) *Attorney, Agent, or Firm*—Wendy Buskop; Buskop Law Group, P.C.

(57) ABSTRACT

A religious meditation apparatus includes at least two feed receptacles, a feed box formed by walls, a removable sliding plate disposed over the feed box, where the sliding plate is both removable in the plane perpendicular to the front wall and has a plate hole, a two guides on the removable sliding plate, a sliding drawer for containing feed located between the two guides on the removable sliding plate, where the sliding drawer has a ramp and a drain hole, a roof with a hinge, a balance plate over the sliding drawer, a drawer stop in the balance plate for preventing withdrawal of the drawer, an inclined floor enabling feed from the drawer to flow unimpeded through the drain hole to the feed receptacles, and a support under the inclined floor extending the length of the feed box. The apparatus can also have a weight-discriminating device.

20 Claims, 8 Drawing Sheets

RELIGIOUS MEDITATION APPARATUS

The present application claims priority to co-pending Provisional U.S. Patent Application Ser. No. 60/424,371 filed Nov. 6, 2002.

FIELD

An embodiment of the application is a device that can be used to enhance meditation concerning religious subjects, particularly on Christian subjects.

An embodiment of the application is a device that can be used as bird feeder with a weight-discriminating device.

BACKGROUND

Christian meditation objects have included wind chimes, altar pieces, images of Jesus Christ, and other articles to enhance an individual meditation on religion.

Additionally, many types and designs of religious meditation apparatus and related products have been developed and are used widely throughout the country. For example, Bloedorn U.S. Pat. No. 6,095,087 and patents cited therein are related devices and are incorporated herein by this reference.

A need has existed for a meditation tool that also acts as a bird feeder so that watching the birds can enhance a religious experience.

Although non-religious individuals have used religious meditation apparatus that are commercially available for relaxation, one problem common to many types of religious meditation apparatus is the difficulty in cleaning the feeder, especially the bottom of the feeder. Also, if seed sits in a feeder or related product for a lengthy period of time, the seed itself can become lodged within the crevices and spaces of the feeder. The seed can then rot and detract from the purpose of the religious meditation apparatus, that is, to attract birds and allow meditation on the associated religious icons used with the feeder simultaneously with the feeding of birds.

In addition, it is possible that rotten seed can contribute to the spread of disease such as West Nile Virus and can kill the birds providing the religious inspiration.

Previous religious meditation apparatus have incorporated various types of metal materials to the bottom or floor of the feeder. These materials include mesh screens, expanded metal, perforated metal, and the like that were subject to oxidization and corrosion. The oxidization and corrosion can taint the seed in the feeder. In the past, plastics and similar materials were thought unsuitable because it was incorrectly believed that such materials required expensive molding equipment and were therefore too expensive. Perforated non-molded plastic was not considered.

It is therefore desirable to design a religious meditation apparatus that will keep bird seed dry and unspoiled as long as possible and is easy to clean, thereby enhancing a meditation experience while viewing religious icons.

An object of the invention is to provide a spiritual meditation device for use, particularly in the Christian religion, that incorporates an improved religious meditation apparatus for small and medium sized birds.

Another object of the invention is to provide a religious meditation apparatus that is easier for small and medium sized birds to use and also readily attracts them while providing effective squirrel resistance.

SUMMARY

The religious meditation apparatus is used to assist in religious meditation and has a side wall with at least one first feed receptacle, another side wall with another feed receptacle. The two side walls are parallel. The front wall perpendicular to the side walls and a back wall opposite of the front wall form a feed box. A removable sliding plate is disposed over the feed box. This removable sliding plate is removable in a plane perpendicular to the front wall. The removable sliding plate further comprises a plate hole though which grain or seed can be poured into the feed box.

Two guides are disposed on the removable sliding plate, in a parallel relationship to each other. One guide is secured to the front wall and the back wall and the other guide is secured to the front wall and the back wall.

A sliding drawer is disposed between the guides on the removable sliding plate. This sliding drawer contains a ramp and a drain hole such that when the sliding drawer is pulled out, such as with a knob, the drain hole aligns with the plate hole permitting feed to flow into the feed box from the sliding drawer.

The apparatus further has a roof with a two panels connected by a hinge forming an inverted V shape. The roof is disposed on the removable sliding plate. The panels are connected to the front wall and the back wall. A balance plate is disposed over the sliding drawer connecting the front wall and the back wall. A drawer stop is disposed in the balance plate for preventing withdrawal of the drawer from engagement with the guides.

An inclined floor connects the side walls enabling feed from the drawer to flow unimpeded through the drain hole to the feed box. A support is disposed under the inclined floor extending the length of the feed box and connected to the front wall on one end and the back wall on the other end.

The religious meditation apparatus can also include a weight-discriminating device in order to keep squirrels and other unwanted animals from keeping to the seed.

Other advantages of the apparatus will become apparent from the following description taken in connection with the accompanying drawings that set forth, by way of illustration and example only, certain embodiments of the present apparatus.

BRIEF DESCRIPTION OF THE DRAWINGS

The present apparatus will be explained in greater detail with reference to the appended figures, in which.

The present apparatus is detailed below with reference to the listed Figures. The drawings constitute part of the specification and include exemplary embodiments of the present apparatus.

DETAILED DESCRIPTION OF THE PREFERRED EMBODIMENTS

Before explaining the present apparatus in detail, it is to be understood that the apparatus is not limited to the particular embodiments and can be practiced or carried out in various ways.

Figure 1:
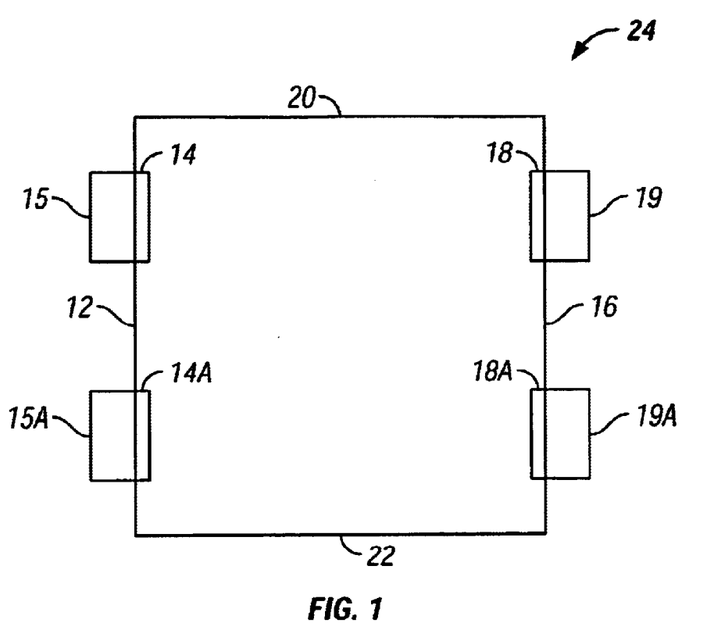
FIG. 1 depicts a top view of the religious meditation apparatus.
Figure 2:
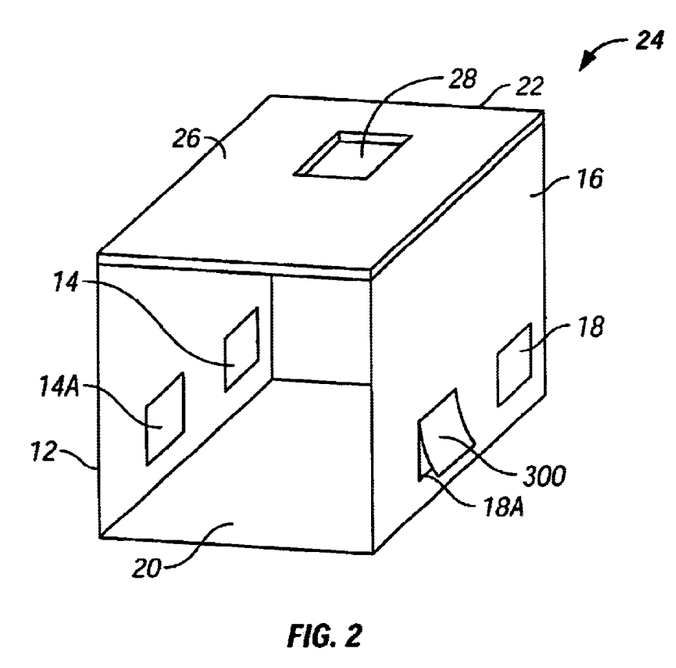
FIG. 2 depicts a three dimensional view of the religious meditation apparatus.

The apparatus, as shown in FIGS. 1 and 2, is a meditation device that relates to a religious meditation apparatus having a first side wall (12) and a second side wall (16) disposed in a parallel relation to each other and opposite each other. The first side wall (12) has at least one feed receptacle (14) disposed in the side. In a preferred embodiment, two feed receptacles are disposed in the side wall. A first feed receptacle (14) and a second feed receptacle (14A) are shown in FIG. 1. At least one feed receptacle (18) is disposed in the second side wall (16) directly opposite the first feed receptacle (14). In a preferred embodiment, as shown in FIG. 2, the second wall (16) has two feed receptacles (18 and 18A).

In a preferred embodiment, the first side wall is parallel to the second side wall. A non-parallel embodiment could be used, as long as the first and second walls can be oriented to form a feed box.

The meditation device also has a front wall (20) connected to the first side wall (12) and the second side wall (16). The front wall (20), in the most preferred embodiment, is perpendicular to the first and second side walls.

FIG. 1 shows the back wall (22) connected to the first side wall (12) and second side wall (18). The back wall (22) preferably is parallel to the front wall (20). The four connected walls form the feed box (24).

FIG. 2 shows a perspective view of the apparatus. The first wall (12) is shown with two feed receptacles disposed in wall (12, 14, and 14A). The feed receptacles may also include trough (15, 15A, 19, and 19A) for the feed. Optional flaps may cover one or more of the feed receptacles so that birds and other animals cannot get into the feed box. FIG. 2 shows a flap (300) covering feed receptacle (14A). The feed box (24) in FIG. 2 is shown having the plate hole (28) disposed in the top of the feed box (24). The plate hole is positioned in the sliding plate (26).

Figure 3:
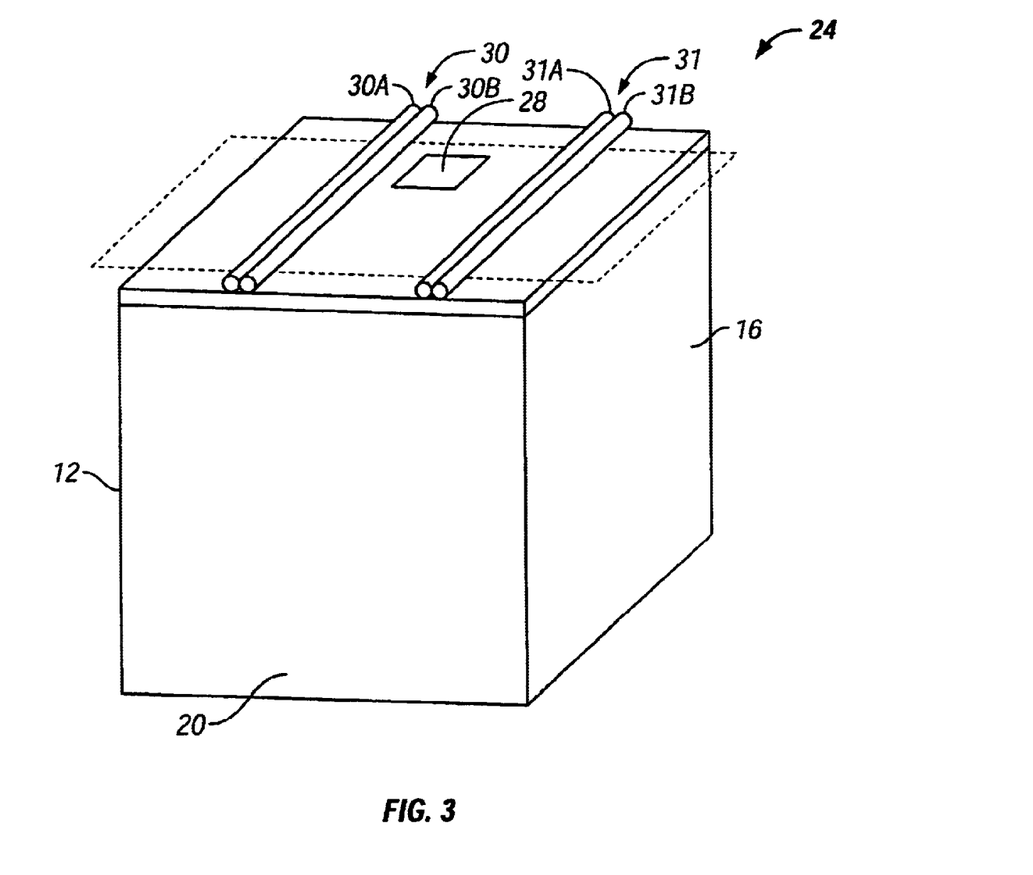
FIG. 3 depicts a three sided view of the religious meditation apparatus showing the guide rails.

FIG. 3 shows the feed box (24) with the removable sliding plate (26) positioned over the four connected walls. This removable sliding plate (26) is removable in the plane perpendicular to the front wall (20).

In the most preferred embodiment, the removable sliding plate (26) further comprises the plate hole (28) and two guide rails for engaging a sliding drawer. The plate hole enables feed to pass into the feed box from the sliding drawer when properly aligned.

A first guide (30) and a second guide (31) are disposed on the removable sliding plate (26). These guides are in a parallel relationship to each other. The first guide (30) is secured on one end (30A) to the front wall (20) and on the other end (30B) to the back wall. The second guide (31) is secured on one end (31A) to the front wall (20) and on the other end (31B) to the back wall.

Figure 4:
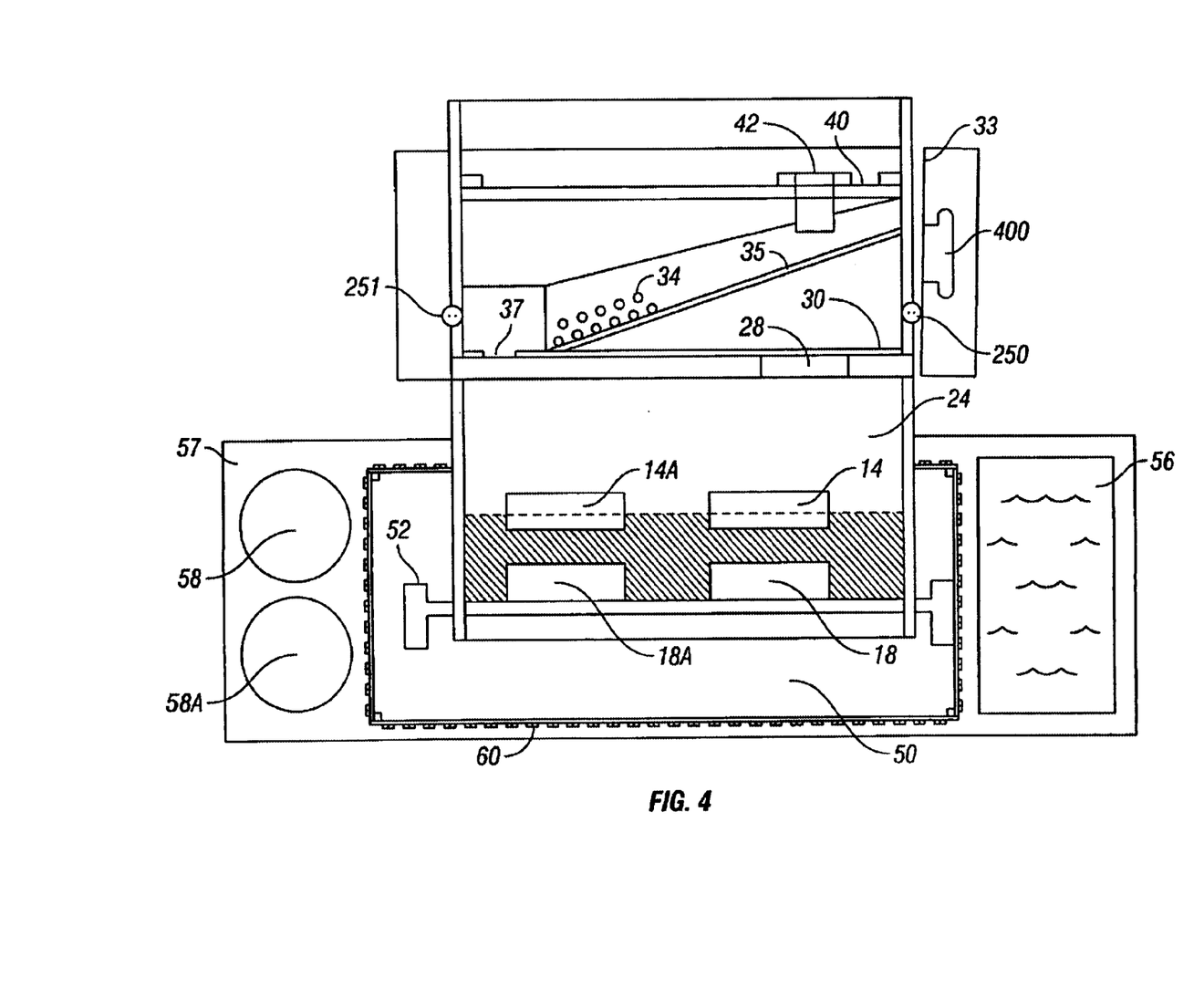
FIG. 4 depicts a cross section view of the religious meditation apparatus.

FIG. 4 shows a side view of the apparatus. In the view, the sliding drawer (33) is disposed above the removable sliding plate containing feed (34). This sliding drawer (33) is disposed between the first guide (30) and the second guide (31) on the removable sliding plate. In FIG. 4, only guide (30) is shown in this side view.

The sliding drawer contains a ramp (35) and a drain hole (37). The drain hole (37) is in a spaced apart relation from the plate hole (28). The sliding drawer can be moved using an optional knob (400). The sliding drawer can be moved, or effectively pulled out, so that the drain hole (37) aligns with the plate hole (28). The alignment permits feed to flow from the sliding drawer into the feed box (24) from the sliding drawer when the sliding drawer is pulled.

FIG. 4 also shows that the meditation apparatus can have landscaping around the feed box, such as water (56) and a fence (60).

FIG. 4 also shows that the birds can sit on a bird perch (52) in front of the feed receptacles (18A and 18) or on the other side in front of the feed receptacles (14 and 14a).

FIG. 4 shows a balance plate (40) disposed over the sliding drawer connecting the front wall and the back wall. A drawer stop (42) is disposed in the balance plate for preventing withdrawal of the drawer from the first and second guides.

FIG. 4 shows alternative embodiments of this meditation device. A miniature landscape (50) can be created surrounding the bird feeder mounted on a base. Landscapes can include the holy family in Bethlehem, the city of Jericho when the walls came tumbling down, a scene from Noah's ark, or similar bible scenes. Biblical scenes are particularly useful since they can accentuate the meditation experience and make it more powerful.

FIG. 4 also shows the first and second securing knobs (250 and 251). The first securing knob is affixed to the front wall though the front panel; the second securing knob is affixed to the back wall through the front panel. The securing knobs are affixed removable. In the preferred embodiment, the securing knobs have a screwed in so the user can insert them and remove them by twisting. The purpose of the securing knobs is to secure the front panel to the back and front walls so the front panel does not accidentally (like from a gust of wind) open allowing debris and rain to enter the unit.

Figure 5:
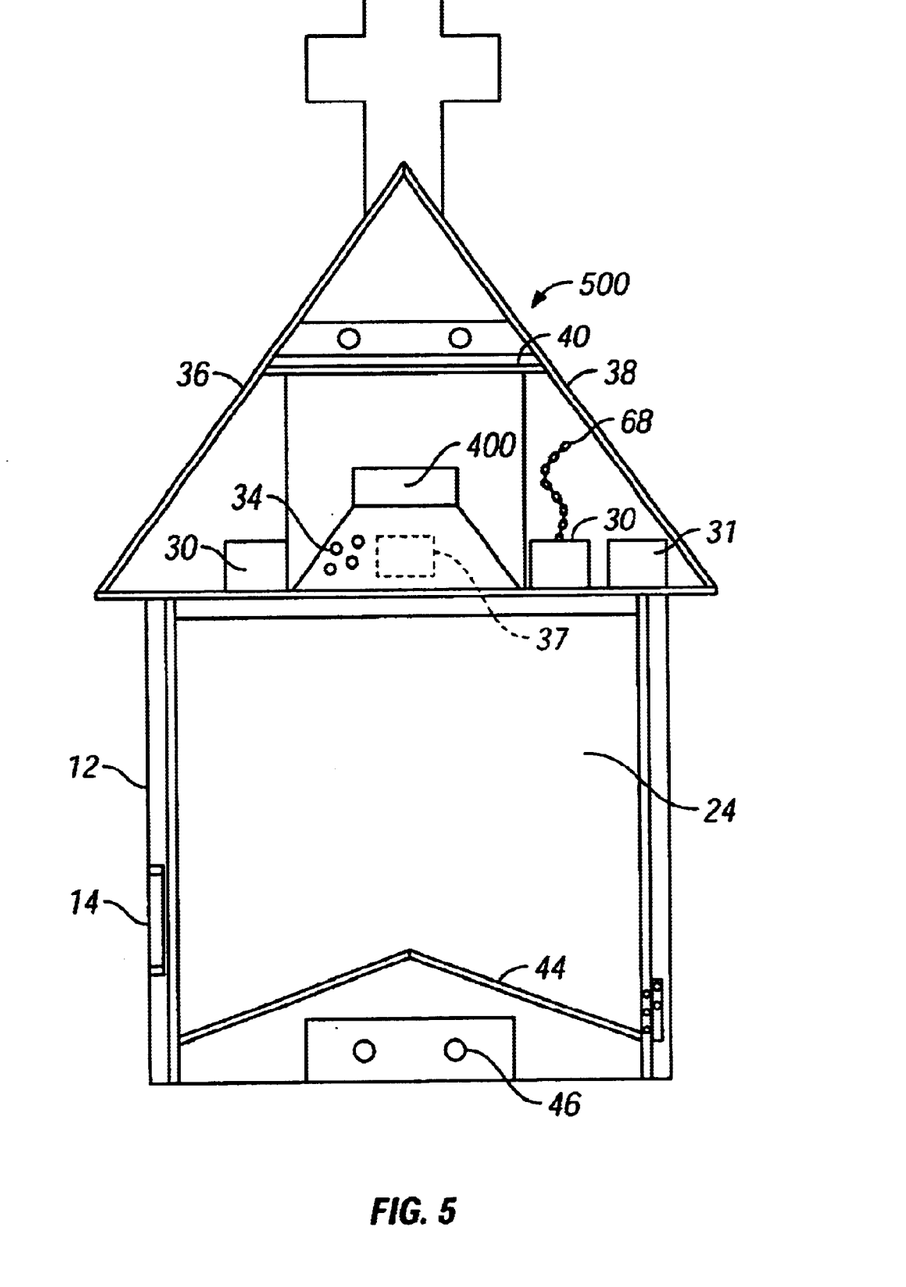
FIG. 5 depicts a cross section view of the religious meditation apparatus.

FIG. 5 shows an inclined floor (44) used to connect the first side wall and the second side wall. This inclined floor enables feed from the sliding drawer to flow unimpeded through the drain hole to the feed box and into the feed receptacles. A support (46) is disposed under the inclined floor (44) extending the length of the feed box and connected to the front wall on one end and the back wall on the other.

Figure 6:
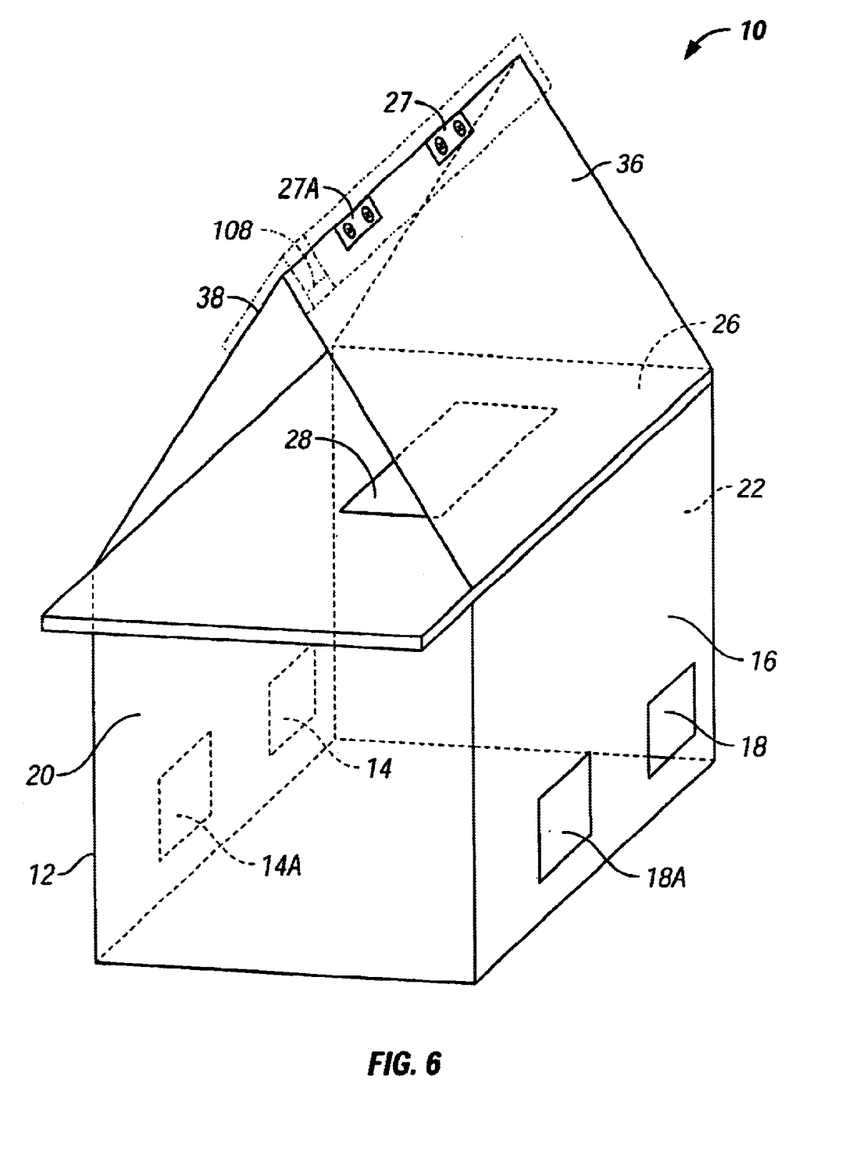
FIG. 6 depicts a three dimensional view of the apparatus.

FIG. 5 shows a church like roof (500) secured over the sliding drawer and connected to the walls and sides of the feed box. The roof has a first panel (36) and second panel (38) disposed on the removable sliding plate. The first panel is connected to the second panel by at least one hinge. FIG. 6 shows a preferred embodiment with two hinges (27 and 27A) shown. The first panel is connected to the front wall and the back wall.

One or both of the hinges may be a piano hinge. FIG. 6 also shows that a cross can be inserted through a leak protection (100) via hole (108).

To maximize the sense of wonder and evoke meditation on the Holy Spirit, the feed box and other components can be made of clear Plexiglas, similar clear plastic, or clear polymer material that can withstand both cold weather (including ice and snow) and hot weather (like in Florida, Jamaica or Guam).

In still another embodiment, the first side wall, second side wall, front wall, back wall, sliding plate, roof guides and drawers can all be made out of wood, glass, metal, painted metal, laminates, plastics, glued paper, similar stiff materials, weather resistant materials, or composites of these materials.

In still another embodiment, at least one of the feed receptacles used on the meditation device can include a bird stand (52) disposed between 0.5 and 1.5 inches from the feed receptacle, as shown in FIG. 4.

Figure 7:
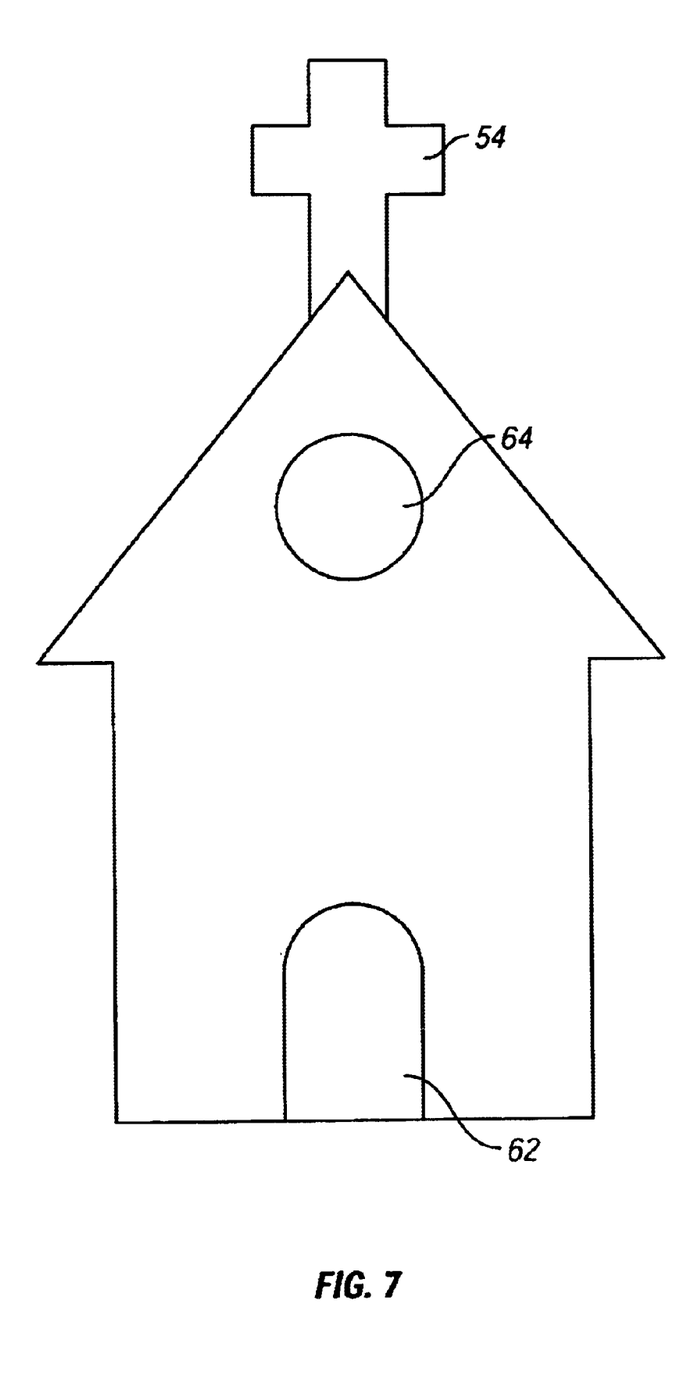
FIG. 7 depicts a front view of the apparatus.

In the most preferred embodiment of the device seen in FIG. 7, the roof further has the shape of a cross (54) secured to the roof to create a spiritual impact when viewed.

Additional elements can be added around the main feed box in order to maximize the spiritual experience of the meditation device, including a birdbath (56) in the miniature landscape on the base. At least one water bowl (58, 58A) can be included as elements; two are shown in FIG. 4. Each water bowl contains drinking water. Each bowl is removably secured to the base (57). The meditation device can be modified to enhance the concept of freeing the spirit of the viewer by mounting a fence (60) to the base and enclosing the feed box.

One or more signs (64) can be disposed on the front wall of the feed box. Alternatively, a door (62) can be mounted in the front wall as shown in FIG. 7.

In one embodiment, the religious meditation apparatus has overall dimensions of a height between 6 inches and 18 inches, a width between 6 inches and 9 inches, and a depth between 6 inches and 12 inches.

It should also be noted that the religious meditation apparatus can have first and second guides connected to the front and back walls with screws (31, 31a, 33, and 33a) for holding the sliding drawer in place.

The inclined floor of the meditation device can have a shape that is either "V" shaped, "A" shaped, or "U" shaped.

It is contemplated that the religious meditation apparatus can include a first guide (30) and a chain (68) connected to the roof holder and the second panel.

Figure 8:
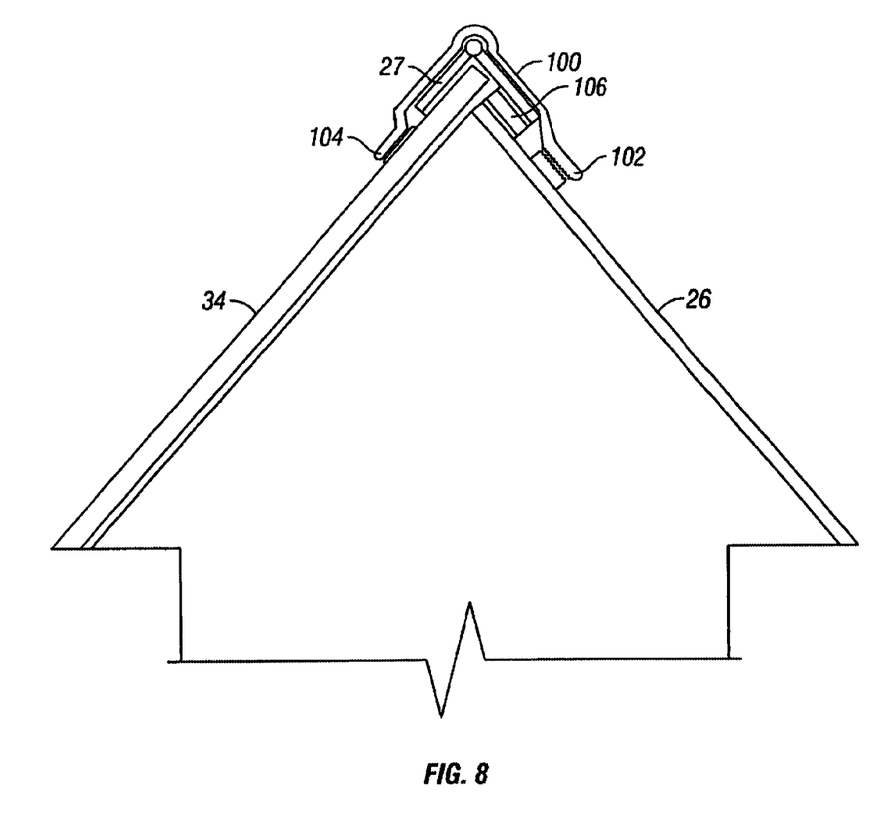
FIG. 8 depicts a cross section view of the apparatus showing the hinge assembly.

FIG. 8 shows a leak protector (100) disposed over the first panel (26) and the second panel (34). The leak protector (100) stops water from entering though hinge (27). Velcro (102) is used along the edge of the leak protector to removably secure the leak protector to one of the first or second panels. Adhesive (104) can be used on the non-Velcro panel to adhere the leak protector to the panel. A shim (106) can be disposed over the panel (26) to elevate the hinge and enable easy access to the container.

Another embodiment is a bird feeder with a weight-discriminating device. The weight-discriminating device is used to keep squirrels and unwanted animals out of the bird feeder. The bird feeder with a weight-discriminating device is shown in FIG. 9.

The bird feeder is a housing assembly (205) with a seed reservoir (210) located within the housing assembly (205). A perch (215) is connected to the housing assembly (205). The perch can be connected either by an assembly affixing the perch to the top of the housing or from underneath. In ether embodiment, the squirrels and unwanted animals will not be able to access the seed reservoir without crossing the moveable platform (225).

Figure 9:
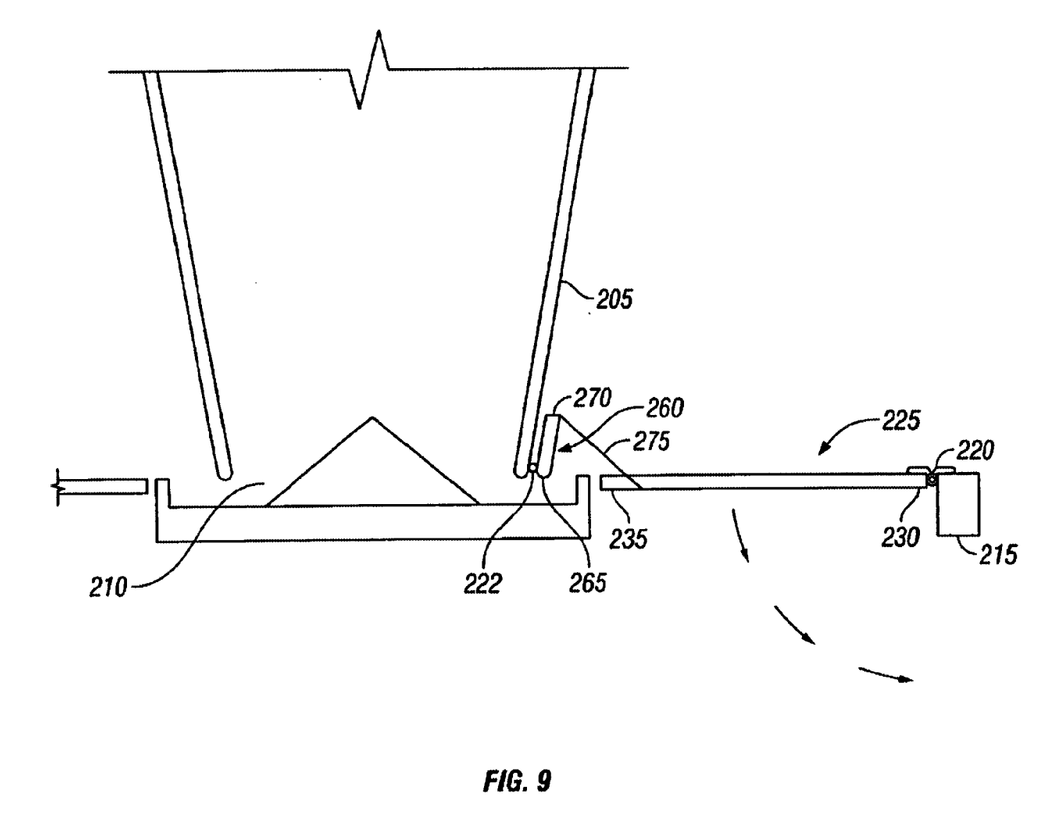
FIG. 9 depicts the weight-discriminating device located on the religious meditation apparatus.

As shown in FIG. 9, the bird feeder uses weight-discriminating spring hinge (220) to connect to the perch (215) to a moveable platform (225). The weight-discriminating spring hinge (220) pivots when a weight heavier than the spring's setting is applied. The feeder contemplates that the spring will be set so weight of a squirrel or similar animal forces the hinge to pivot. When the weight-discriminating spring hinge (220) pivots, the moveable platform (225) opens and the squirrel or unwanted animal falls away from the bird feeder.

The moveable platform (225) has a platform first end (230) and a platform: second end (235). The platform first end is connected to the perch by the weight-discriminating spring hinge.

The bird feeder also has a hatch (260) with a hatch first end (265) and a hatch second end (270). The hatch first end (265) is pivotably connected to the housing by a hinge (222). When the moveable platform (225) opens, a cable (275) connected the hatch second end and the platform second end pulls the hatch closed over the seed reservoir (210). When the moveable platform (225) returns to the closed position, the hatch (260) opens allowing access to the seed reservoir (210).

While this apparatus has been described with emphasis on the preferred embodiments, it should be understood that within the scope of the appended claims, the apparatus might be practiced other than as specifically described herein.

What is claimed is:

1. A religious meditation apparatus comprising:
   a. a first side wall having at least one first feed receptacle,
   b. a second side wall having at least one second feed receptacle and wherein the first side wall is parallel to the second side wall;
   c. a front wall connected to the first side wall and second side walls, wherein the front wall is perpendicular to the first and second side walls;
   d. a back wall connected to the first side wall and second side walls wherein the back wall is parallel to the front wall, wherein said walls are connected forming a feed box;
   e. a removable sliding plate disposed over the feed box, wherein said removable sliding plate is removable in the plane perpendicular to the front wall and the removable sliding plate further comprises a plate hole;
   f. a first guide and a second guide disposed on the removable sliding plate, wherein said guides are in parallel relationship to each other, and the first guide is secured to the front wall and the back wall and the second guide is secured to the front wall and the back wall;
   g. a sliding drawer for containing feed disposed between the first guide and the second guide on the removable sliding plate and, wherein said sliding drawer contains a ramp and a drain hole and wherein said drain hole is in a spaced apart relation from the plate hole and, when the sliding drawer is pulled out, the drain hole aligns with the plate hole permitting feed to flow into the feed box when the sliding drawer is pulled;
   h. a roof having a first panel and second panel, disposed on the removable sliding plate, wherein said first panel is connected to said second panel by a hinge and the first panel is connected to the front wall and the back wall;
   i. a balance plate disposed over the sliding drawer connecting the front wall and the back wall;
   j. drawer stop disposed in the balance plate for preventing withdrawal of the drawer from the first and second guides;
   k. an inclined floor connecting the first side wall and the second side wall, enabling feed from the drawer to flow unimpeded through the drain hole to the feed receptacles; and
   l. a support disposed under the inclined floor extending the length of the feed box connected to the front wall on one end and the back wall on the other.

2. The religious meditation apparatus of claim 1, further comprising a miniature landscape surrounding said bird feeder mounted on a base.

3. The religious meditation apparatus of claim 2, further comprising a bird bath in the miniature landscape on the base.

4. The religious meditation apparatus of claim 3, further comprising at least one water bowl containing drinking water mounted to the base.

5. The religious meditation apparatus of claim 2, wherein said miniature landscape further comprises a fence mounted to the base.

6. The religious meditation apparatus of claim 1, wherein at least two hinges are used to connect the first panel and the second panel.

7. The religious meditation apparatus of claim 6, further comprising a leak protector disposed over said hinge.

8. The religious meditation apparatus of claim 7, further comprises a Velcro strip disposed on one edge detachably connecting to the panels.

9. The religious meditation apparatus of claim 1, wherein the hinge is a piano hinge.

10. The religious meditation apparatus of claim 1, wherein all components are made of clear Plexiglas.

11. The religious meditation apparatus of claim 1, wherein the first side wall, second side wall, front wall, back wall, sliding plate, roof guides and drawers are a member of the group comprising: wood, glass, metal, painted metal, laminates, plastics, composites, glued paper, and similar stiff materials.

12. The religious meditation apparatus device of claim 1, wherein at least one of said feed receptacles includes a bird stand disposed between 0.5 and 1.5 inches from the feed receptacle.

13. The religious meditation apparatus of claim 1, wherein said roof is in the shape of a church with a cross to create a spiritual impact when viewed.

14. The religious meditation apparatus of claim 1 further comprising a sign disposed on the front wall.

15. The religious meditation apparatus of claim 1, further comprising a door mounted in the front wall.

16. The religious meditation apparatus of claim 1, wherein the dimensions of the religious meditation apparatus are a height between 6 inches and 18 inches, a width between 6 inches and 9 inches, and a depth between 6 inches and 12 inches.

17. The religious meditation apparatus of claim 1, wherein said first and second guides are connected to the front and back walls with screws.

18. The religious meditation apparatus of claim 1, wherein the inclined floor is selected from the group: "V" shaped, "A" shaped, and "U" shaped.

19. The religious, meditation apparatus of claim 1, further comprising a first guide and a chain connected to the roof holder and the second panel.

20. The religious meditation apparatus of claim 1, further comprising a first securing knob connected to the front wall through the first panel and a second securing knob connected to the back wall through the first panel.

* * * * *